(12) United States Patent
Vankerkhove

(10) Patent No.: US 9,212,901 B2
(45) Date of Patent: Dec. 15, 2015

(54) APPARATUS AND METHODS FOR PERFORMING WAVEFRONT-BASED AND PROFILE-BASED MEASUREMENTS OF AN ASPHERIC SURFACE

(71) Applicant: CORNING INCORPORATED, Corning, NY (US)

(72) Inventor: Steven James Vankerkhove, Webster, NY (US)

(73) Assignee: Corning Incorporated, Corning, NY (US)

( * ) Notice: Subject to any disclaimer, the term of this patent is extended or adjusted under 35 U.S.C. 154(b) by 156 days.

(21) Appl. No.: 14/208,250

(22) Filed: Mar. 13, 2014

(65) Prior Publication Data

US 2014/0313517 A1    Oct. 23, 2014

Related U.S. Application Data

(60) Provisional application No. 61/812,792, filed on Apr. 17, 2013.

(51) Int. Cl.
*G01B 11/02* (2006.01)
*G01B 11/24* (2006.01)
*G01M 11/00* (2006.01)
*G01M 11/02* (2006.01)

(52) U.S. Cl.
CPC ............ *G01B 11/2441* (2013.01); *G01B 11/24* (2013.01); *G01M 11/005* (2013.01); *G01M 11/0271* (2013.01)

(58) Field of Classification Search
CPC ............... G01B 11/2441; G01B 11/24; G01B 9/02047; G01B 9/021; G01B 9/023; G01B 9/029; G01B 9/02038; G01B 9/02087; G01M 11/005; G01M 11/02; G01M 11/025; G01M 11/0271
USPC ........................................................ 356/513
See application file for complete search history.

(56) References Cited

U.S. PATENT DOCUMENTS 5,737,079 A    4/1998  Burge et al.
7,140,119 B2  11/2006  Badami et al.
7,433,057 B2 * 10/2008  Murphy ................... G01J 9/02
                                                356/601

(Continued)

FOREIGN PATENT DOCUMENTS

JP        2003156405         5/2003

OTHER PUBLICATIONS

Patent Abstract of JP2003156405.
(Continued)

*Primary Examiner* — Tarifur Chowdhury
*Assistant Examiner* — Jonathon Cook
(74) *Attorney, Agent, or Firm* — Robert L. Carlson

(57) ABSTRACT

Apparatus and methods for performing wavefront-based and profile-based measurements of an aspheric surface are disclosed. The apparatus includes an interferometric wavefront measurement system that collects wavefront-based measurement data of the aspheric surface. The apparatus also includes a profile measurement system that performs at least one non-contact profile-based measurement of the aspheric surface to collect profile-based measurement data of the aspheric surface. The measurements are performed without removing the aspheric element from a rotatable base. The two measurements are then used to form a combined measurement of the aspheric surface.

20 Claims, 7 Drawing Sheets

(56) References Cited

U.S. PATENT DOCUMENTS

| | | | |
|---|---|---|---|
| 8,593,642 B2* | 11/2013 | Freimann | G01B 11/2441 356/512 |
| 2003/0002048 A1* | 1/2003 | Zanoni | G01B 11/2441 356/512 |
| 2005/0157311 A1 | 7/2005 | Kuchel | |
| 2006/0290942 A1 | 12/2006 | Henselmans et al. | |
| 2007/0247639 A1 | 10/2007 | Amstel et al. | |

OTHER PUBLICATIONS

PCT/US14/033950 Search Report.

Arnold; "How to Test an Asphere With a Computer Genreated Hologram"; SPIE vol. 1052 Holographic Optics: Optically and Computer Generated (1989) pp. 191-197.

Optical Shop Testing, Wiley $2^{nd}$ Edition 1992, Chapter 15, "Holographic and Speckle Tests" Sub Section 15.3 "Interferometers Using Synthetic Holograms" 1 Page.

* cited by examiner

FIG. 6A  FIG. 6B

APPARATUS AND METHODS FOR PERFORMING WAVEFRONT-BASED AND PROFILE-BASED MEASUREMENTS OF AN ASPHERIC SURFACE

This application claims the benefit of priority under 35 U.S.C. §119 of U.S. Provisional Application Ser. No. 61/812,792 filed on Apr. 17, 2013 the content of which is relied upon and incorporated herein by reference in its entirety.

FIELD

The present disclosure relates generally to characterizing a surface and in particular to an apparatus and methods for performing a profile-based measurement and a wavefront-based measurement of an aspheric surface.

BACKGROUND

Non-spherical or "aspheric" surfaces are finding increasing use in optical systems because they offer an additional degree of design freedom. As the technology for creating aspheric surfaces improves, optical components with aspheric surfaces are being employed with increasing regularity in devices from cell phones to DVD players to video and still cameras.

With the increasing use of aspheric surfaces comes the increasing need to rapidly and accurately measure and characterize such surfaces. There are two main measurement techniques used to characterize aspheric surfaces. The first utilizes a wavefront-based measurement using wavefront interferometry. This measurement involves passing a wavefront through or reflecting a wavefront from the aspheric surface and then interfering the wavefront with a reference wavefront. The interference creates interference fringes that are representative of the deviation of the surface shape from the target aspheric surface shape.

The second technique utilizes a profile-based measurement using point measurement profilometry. This measurement involves scanning a non-contact optical measurement probe over the aspheric surface to accurately measure a gap between the aspheric surface and the probe. Because the path over which the measurement probe scans is well defined, the path provides a reference surface for measuring the deviation of the aspheric surface.

Each of these measurement techniques has advantages and disadvantages. For example, the wavefront-based measurement is very good at measuring the non-rotationally symmetric shapes and surface variations in the mid-spatial-frequency range but is not very good at measuring the rotationally symmetric surface component. On the other hand, the profile-based measurement is good at measuring the rotationally symmetric component but is not very good at measuring the non-rotationally symmetric component. This measurement is also not very good at measuring mid-spatial-frequency components because the scanning beam has a spatial extent (e.g., about 100 microns) that limits the measurement resolution. The profile-based measurement also has an inherent noise signature that masks certain surface errors.

Consequently, to obtain the best possible characterization of the aspheric surface, one needs to move the aspheric element from one measurement system to another measurement system and separately obtain the profile-based and wavefront-based measurements. The measurement data then needs to be collected from the two different measurement systems and combined to arrive at the final characterization of the aspheric surface. This takes an inordinate amount of time and effort.

SUMMARY

An aspect of the disclosure is an apparatus for measuring a shape of an aspheric surface of an aspheric element. The apparatus includes a support structure and a moveable stage moveably attached to the support structure. The apparatus also includes a rotatable base disposed on the movable stage and adapted to rotatably support the aspheric element along an apparatus axis. An interferometric wavefront measurement system is operably supported by the support structure and is adapted to optically interrogate the aspheric surface with a measurement wavefront to collect wavefront-based measurement data of the aspheric surface. A profile measurement system is operably supported by the support structure and is adapted to perform at least one non-contact profile-based measurement of the aspheric surface to collect profiling-based measurement data of the aspheric surface. A controller is adapted to receive and process the wavefront based measurement data and the profile-based measurement data to define a combined measurement of the aspheric surface.

Another aspect of the disclosure is the apparatus as described above, wherein the support structure comprises a platform that supports first and second support pillars, and wherein the interferometric wavefront measurement system is supported by the first support pillar and the profile measurement system is supported by the second support pillar.

Another aspect of the disclosure is the apparatus as described above, wherein the interferometric wavefront measurement system includes a null optical element that is moveably mounted to the first support pillar.

Another aspect of the disclosure is the apparatus as described above, wherein the controller includes a processor and a memory, with the memory including ideal aspheric surface-shape data; the wavefront-based measurement data includes a non-rotationally symmetric data component and a mid-spatial-frequency component, wherein the profile-based measurement data includes a rotationally symmetric data component; and the controller is operably configured with instructions embodied in a computer-readable medium to cause the processor to process the non-rotationally symmetric data component, the mid-spatial-frequency component, the rotationally symmetric data component and the ideal aspheric surface-shape data to define the combined measurement of the aspheric surface.

Another aspect of the disclosure is the apparatus as described above, wherein the apparatus includes the aspheric element, and wherein the aspheric element has either a generally concave or generally convex surface.

Another aspect of the disclosure is the apparatus as described above, wherein the aspheric element comprises a mirror.

Another aspect of the disclosure is the apparatus as described above, wherein the aspheric element has an actual manufactured aspheric surface shape and a target aspheric surface shape, and wherein combined measurement of the aspheric surface includes a difference between the actual manufactured aspheric shape and the target aspheric surface shape.

Another aspect of the disclosure is an apparatus for measuring a shape of an aspheric surface of an aspheric element that has an actual manufactured aspheric shape and a target aspheric surface shape. The apparatus includes a moveable stage that supports a rotatable base, the rotatable base being adapted to rotatably support the aspheric element along an apparatus axis; an interferometric wavefront measurement system operably arranged relative to the aspheric element and that optically interrogates the aspheric surface with a measurement wavefront to collect wavefront-based measurement data of the aspheric surface; a profile measurement system operably arranged relative to the aspheric element and that optically interrogates the aspheric surface with probe light to perform at least one non-contact, profile-based measurement of the aspheric surface to collect profile-based measurement data of the aspheric surface; and a controller adapted to receive and process the wavefront-based measurement data and the profile-based measurement data to define a combined measurement of the aspheric surface.

Another aspect of the disclosure is the apparatus as described above, wherein: the controller includes a processor and a memory, with the memory including data representative of the target aspheric-surface-shape data; the wavefront-based measurement data includes a non-rotationally symmetric data component and a mid-spatial-frequency component, wherein the profile-based measurement data includes a rotationally symmetric data component; and the controller is operably configured with instructions embodied in a computer-readable medium to cause the processor to process the non-rotationally symmetric data component, the mid-spatial-frequency component, the rotationally symmetric data component and the target aspheric-surface-shape data to define the combined measurement of the aspheric surface.

Another aspect of the disclosure is the apparatus as described above, wherein combined measurement of the aspheric surface includes a difference between the actual manufactured aspheric shape and the target aspheric surface shape.

Another aspect of the disclosure is the apparatus as described above, wherein the apparatus includes the aspheric element, and wherein the aspheric element has either a generally concave or generally convex surface.

Another aspect of the disclosure is the apparatus as described above, wherein the interferometric wavefront measurement system and the profile measurement system are respectively supported by first and second pillars, each of which is supported by a platform, and wherein the moveable stage is moveably supported by the first pillar.

Another aspect of the disclosure is a method of characterizing an aspheric surface of an aspheric element that has an actual manufactured aspheric shape and a target aspheric surface shape. The method includes: supporting the aspheric element on a rotatable base; performing at least one wavefront-based measurement of the aspheric surface to obtain wavefront-based measurement data that includes a non-rotationally symmetric data component and a mid-spatial-frequency data component; performing at least one profile-based measurement of the aspheric surface to obtain profile-based measurement data that includes a rotationally symmetric data component; defining, from the non-rotationally symmetric data component, the mid-spatial-frequency data component, the rotationally symmetric data component and the target aspheric surface shape, a deviation of the actual manufactured aspheric shape from the target aspheric surface shape; and wherein said performing of the at least one wavefront-based measurement and the at least one profile-based measurement are performed without removing the aspheric element from the rotatable base.

Another aspect of the disclosure is the method as described above, further comprising: performing multiple wavefront-based measurements of the aspheric surface at different angular positions of the rotatable base; and processing the multiple wavefront-based measurements to reduce a measurement error in the non-rotationally symmetric data component.

Another aspect of the disclosure is the method as described above, wherein performing at least one profile-based measurement includes performing between 1 and 10 profile-based measurements.

Another aspect of the disclosure is the method as described above, wherein the at least one profile-based measurement is performed before the at least one wavefront-based measurement.

Another aspect of the disclosure is the method as described above, wherein the at least one wavefront-based measurement is performed by a wavefront interferometer system, the at least one profile-based measurement is performed by a profile measurement system, and wherein the wavefront interferometer system and the profile measurement system are each operably supported by a support frame that also supports the rotatable base on a moveable stage.

Another aspect of the disclosure is the method as described above, wherein the aspheric element has either a generally concave or generally convex aspheric surface.

Another aspect of the disclosure is the method as described above, and further including averaging multiple profile-based measurements to establish the profile-based measurement data.

Another aspect of the disclosure is the method as described above, further comprising using a controller operably configured with instructions embodied in a computer-readable medium to cause a processor of the controller to process the non-rotationally symmetric data component, the mid-spatial-frequency component, the rotationally symmetric data component and the target aspheric-surface-shape data to determine the deviation of the actual manufactured aspheric shape from the target aspheric surface shape.

Additional features and advantages will be set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which:

FIGS. 6A and 6B are gray-scale plots (derived from color plots) that respectively illustrate the non-rotationally symmetric data component and mid-spatial-frequency data component of the wavefront-based data, wherein the data components represent the deviation from a target or ideal shape of the aspheric surface;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Cartesian coordinates are shown in some of the Figures for the sake of reference and are not intended to be limiting as to direction or orientation.

Figure 1:
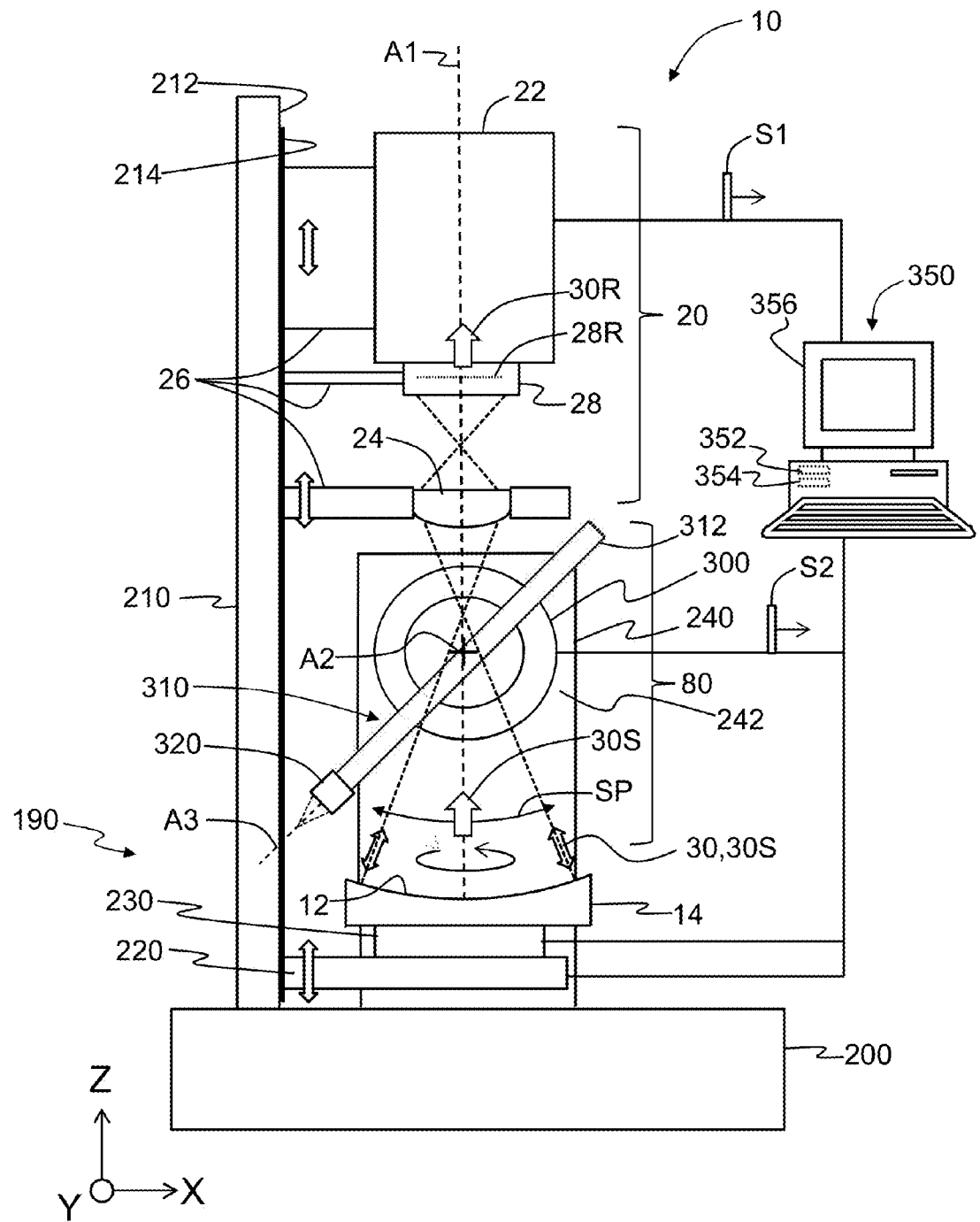
FIG. 1 is a front-on view and FIG. 2 is a side view of an example embodiment of the integrated or "total" aspheric surface measurement apparatus disclosed herein.
Figure 2:
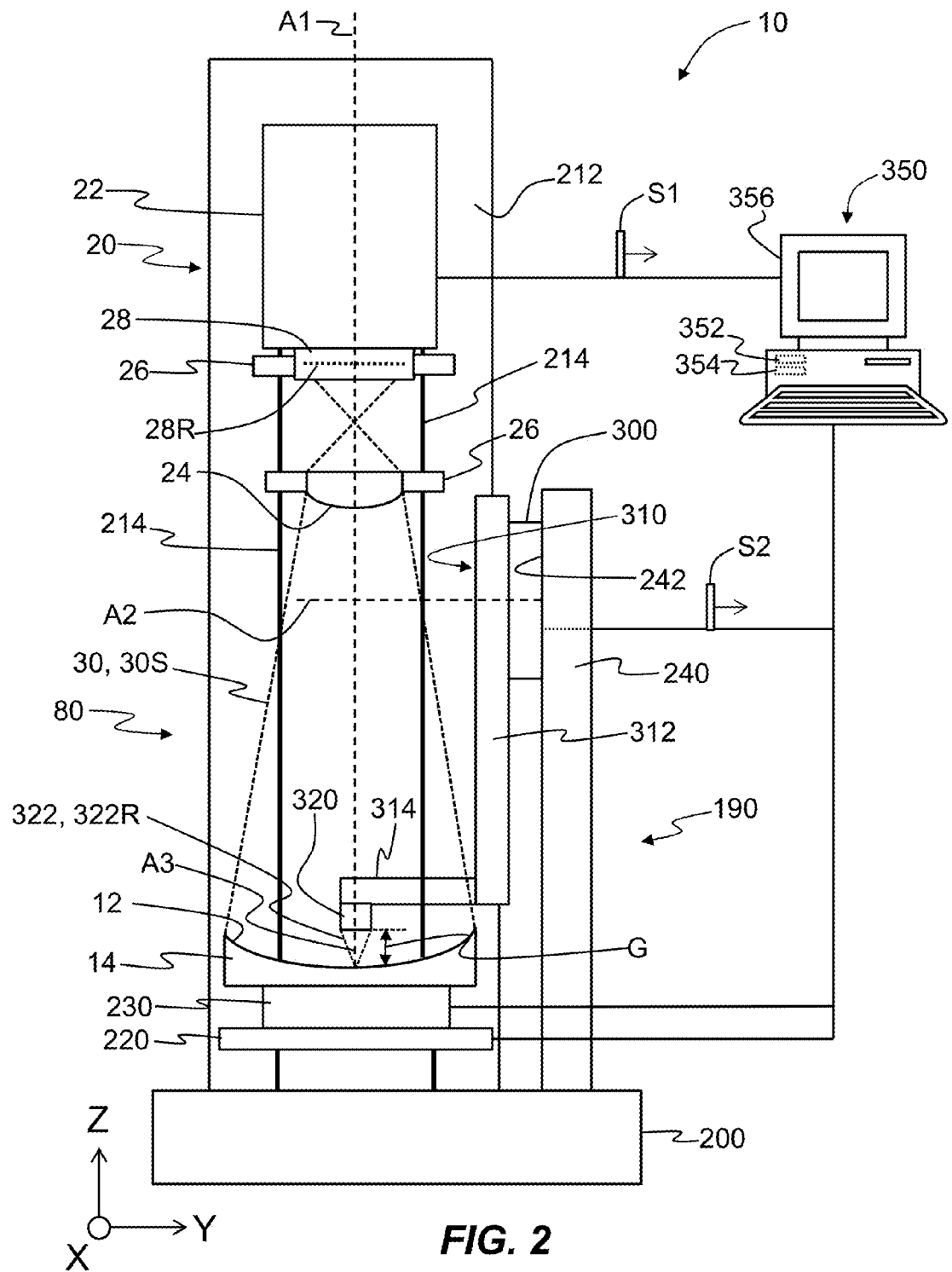
Figure 3:
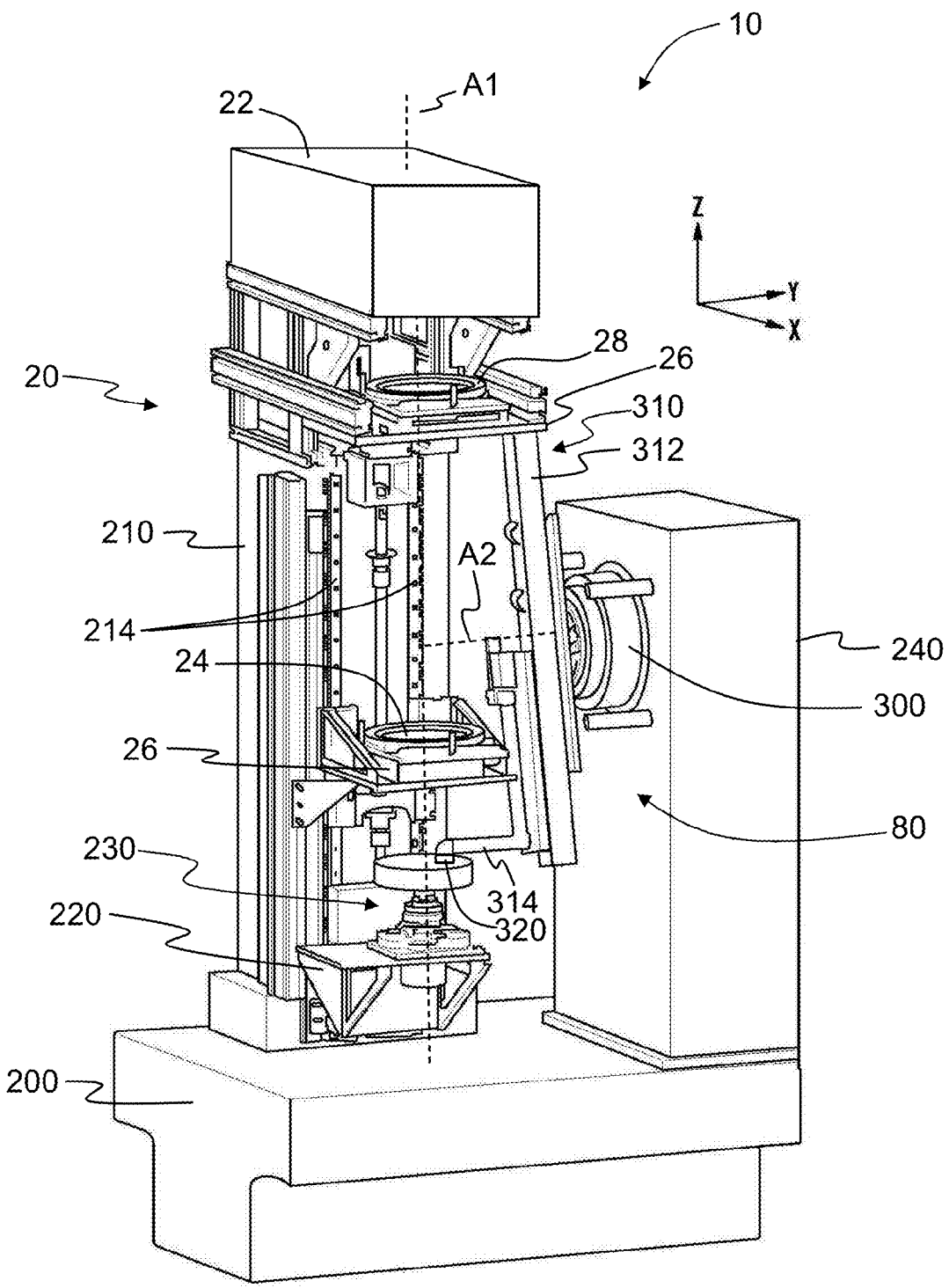
FIG. 3 is a front elevated front view of the aspheric surface measurement apparatus.
Figure 5:
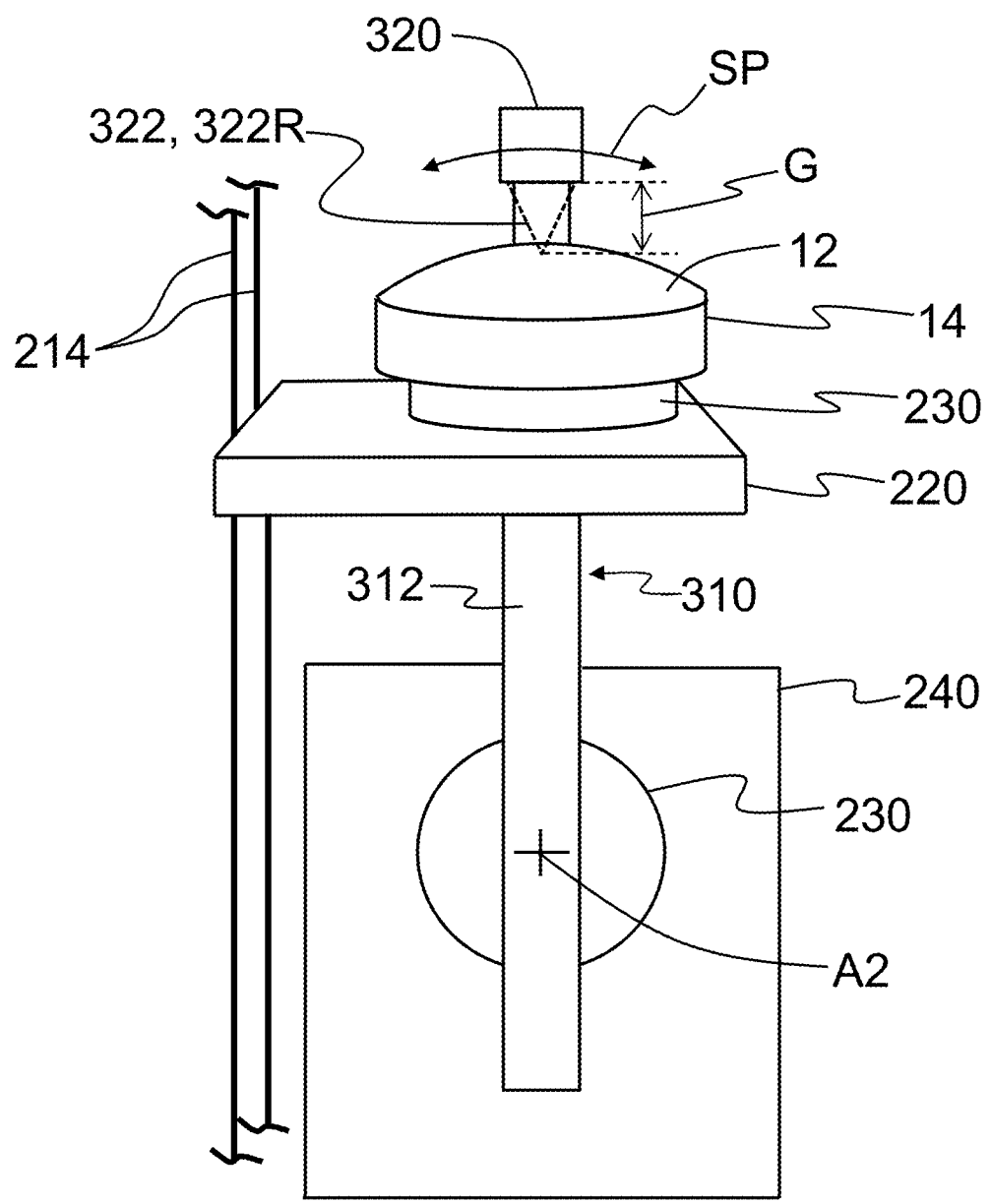
FIG. 5 is a side view of the aspheric surface measurement apparatus as configured to measure a generally convex aspheric element.

FIG. 1 is a front-on view and FIG. 2 is a side view of an example embodiment of an integrated or "total" aspheric surface measurement apparatus ("apparatus") 10, while FIG. 3 is a front elevated view of the apparatus. The apparatus 10 is adapted for measuring an aspheric surface 12 of an aspheric element 14 using a wavefront-based measurement and a profile-based measurement, as described below. The aspheric element 14 can be a mirror, a refractive lens, or any other type of optical element that can support an aspheric shape. The aspheric surface 12 can be either generally concave or generally convex. The aspheric element 14 as shown in FIGS. 1 through 3 is generally concave by way of illustration. FIG. 5, introduced and discussed below, illustrates an embodiment of apparatus 10 configured to measure a generally convex aspheric element 14.

The apparatus 10 includes an interferometric wavefront measurement system ("interferometric system") 20 and a profile measurement system ("profile system") 80, each arranged relative to aspheric element 14. The aspheric element 14 is centered on an apparatus axis A1. The apparatus 10 also includes a support structure 190 that in an example includes a platform 200 that lies in the X-Y plane. The platform 200 supports a first support pillar 210 having a front surface 212 that resides in the Y-Z plane and a second support pillar 240 having a front surface 242 that resides in the X-Z plane.

Figure 4:
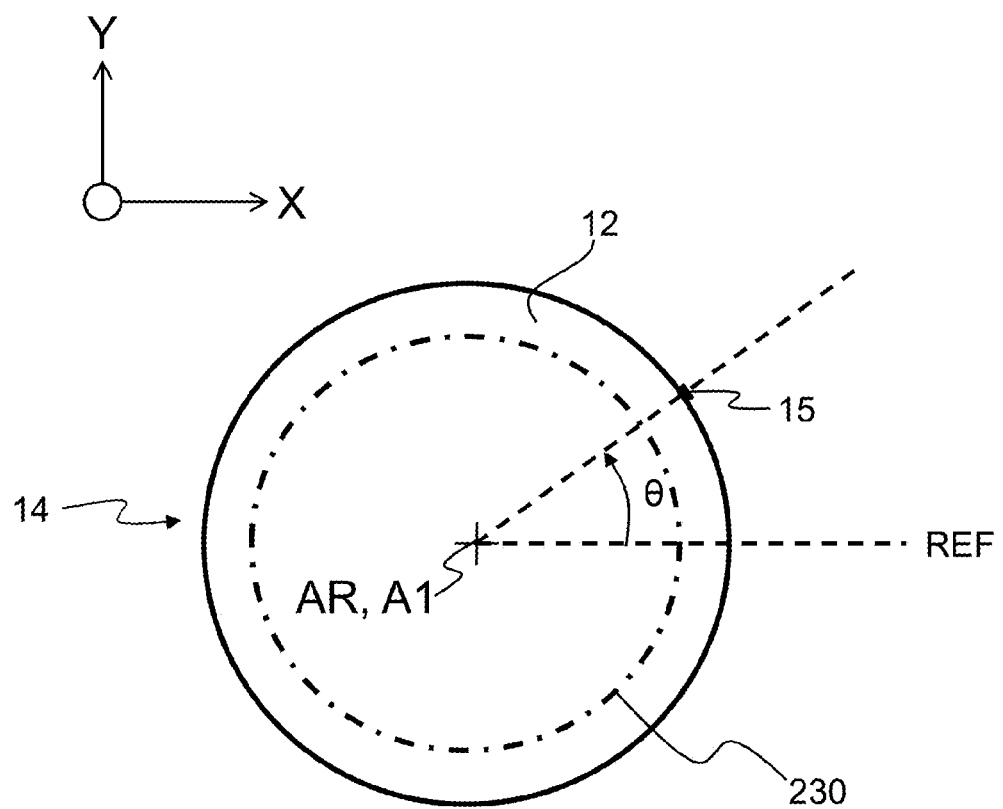
FIG. 4 is a top-down view of an aspheric element residing on a base, which is shown in phantom.

The front surface 212 of first support pillar 210 supports vertical rails 214. A movable stage 220 is mounted to rails 214 and can move up and down the rails in the Z-direction. The movable stage 220 supports a base 230 that in turn is adapted to support aspheric element 14. The base 230 is adapted to rotate about a rotation axis AR (which is coaxial with optical axis A1) so that aspheric element 14 can be rotated about the optical axis. FIG. 4 is a top-down view of aspheric element 14 residing on base 230, which is shown in phantom. The rotation of base 230 causes aspheric element 14 to rotate about optical axis A1 relative to a reference REF to place the aspheric element at an orientation angle $\theta$ relative thereto. In an example, aspheric element 14 includes a mark or indicia 15 (e.g., on the side of the element) that allows for the aspheric element to be placed in a select orientation relative to reference REF. In an example, base 230 comprises an air bearing. The base 230 and thus aspheric element 14 can have different angular positions $\theta$ as defined by different amounts of rotation relative to reference REF.

With reference again to FIGS. 1 through 3, first support pillar 210 can also be used to moveably support the main components of interferometric system 20, such as a light source and detection optical system 22 and a null optical element 24, via support members 26 that are mounted to rails 214. The support members 26 can move up and down rails 214 so that the position of light source and detection optical system 22 and null optical element 24 can be adjusted. In another example embodiment, light source and detection optical system 22 is mounted to first support pillar 210 in a fixed position.

In an example, null optical element 24 is an aspheric element, while in another example the null optical element is a computer-generated hologram (CGH) element. The null optical element 24 is adapted to transform the measurement wavefront to that of the target (i.e., anticipated or ideal) shape of aspheric surface 12. The transformation of the measurement wavefront is such that the wavefront is normally incident upon aspheric surface 12 over the entire surface (or at least that portion of the surface being measured).

In an example, wavefront interferometric system 20 also includes an optical system 28, such as a Fizeau lens system, which may also be moveably supported by first support pillar 210 via one of the support members 26. The optical system 28 includes a reference surface 28R that provides a reference wavefront for making the interferometric measurement.

The second support pillar 240 operably supports a rotational support member 300 that in turn supports an optical measurement probe 310. In an example embodiment, rotational support member 300 comprises an air bearing. The optical measurement probe 310 can thus be rotated by rotational support member 300 about a rotation axis A2 that is aligned in the Y-direction. The optical measurement probe 310 includes a first arm 312 that is secured to rotational support member 300 and resides in the X-Z plane.

The optical measurement probe 310 also includes a second arm 314 that extends from first arm 312 at a right angle so that it is parallel to rotation axis A2. The second arm 314 supports an optical head 320 adapted to emit a focused probe light beam (i.e., probe light) 322 along an optical axis A3 that is parallel to first arm 312. In an example embodiment, probe light 322 is laser light. When first arm 312 is aligned in the Z-direction, optical axis A3 is also aligned in the Z-direction and is coaxial with apparatus axis A1, which passes through the center of aspheric element 14.

The apparatus 10 also includes a controller 350 adapted to control the overall operation of the apparatus as described below. In an example, controller 350 includes a display 356. In an example, controller 350 is operably connected to rotational support member 300, moveable stage 220, and rotatable base 230. In an example, controller 350 comprises a computer or like machine that is adapted (e.g., via instructions such as software embodied in a computer-readable or machine-readable medium) to cause the controller to control the operation of the various components of apparatus 10. The controller 350 includes a processor unit ("processor") 352 and a memory unit ("memory") 354. An example controller 350 is or includes a computer with a processor and includes an operating system such as Microsoft WINDOWS or LINUX.

In an example embodiment, processor 352 is or includes any processor or device capable of executing a series of software instructions and includes, without limitation, a general- or special-purpose microprocessor, finite state machine, controller, computer, central-processing unit (CPU), field-programmable gate array (FPGA) or digital signal processor.

The memory 354 is operably connected to processor 352. As used herein, the term "memory" refers to any processor-readable medium including but not limited to RAM, ROM, EPROM, PROM, EEPROM, disk, floppy disk, hard disk, CD-ROM, DVD or the like on which may be stored a series of instructions executable by processor 352.

The measurement methods described herein may be implemented in various embodiments in a machine-readable medium (e.g., memory 354) comprising machine-readable instructions (e.g., computer programs and/or software modules) for causing controller 350 to perform the measurement methods described herein by controlling the operation of apparatus 10. In an example embodiment, the computer programs run on processor 352 out of memory 354.

The computer programs and/or software modules may comprise multiple modules or objects in order to perform the various methods of the present disclosure and to control the operation and function of the various components of apparatus 10. The type of computer programming languages used for the code may range from procedural code-type languages to object-oriented languages. The files or objects need not have a one-to-one correspondence to the modules or method steps described. Further, the method and system may comprise combinations of software, hardware and firmware. Firmware can be downloaded into processor 352 for implementing the various example embodiments disclosed herein.

The controller 350 includes information stored in memory 354 about aspheric element 14. This information includes the target or ideal shape of aspheric surface 12 (e.g., based on aspheric coefficients, conic constants, and other mathematical surface shape parameters of the standard aspheric equation, etc.), the overall size of aspheric element 14, etc. This information is referred to herein as the "ideal aspheric-surface-shape data." The manufactured aspheric surface 12 falls short of the target or ideal shape due to shortcomings in the asphere manufacturing process.

The controller 350 also includes software embodied in a computer-readable medium that causes processor 352 to process measurement data from the wavefront-based measurement and the profile-based measurement to create a combined (or "complete") characterization of aspheric surface 12. In an example, the combined characterization is a representation of the deviation of the as-manufactured aspheric surface 12 from its target or ideal shape. In another example, the combined characterization is the actual measured surface shape.

FIG. 5 is a close-up view of profile system 80 of apparatus 10, illustrating how it is configured for measuring aspheric element 14 when aspheric surface 12 is generally convex. In the configuration of FIG. 5, stage 220 is moved in the Z-direction to be above rotation axis A2. The optical measurement probe 310 is essentially swung upside-down (i.e., rotated by 180 degrees) relative to its orientation when measuring a concave aspheric surface 12. The optical head 320 is also rotated 180 degrees so that it can direct light 322 in the −Z-direction and toward the generally convex aspheric surface 12. In this configuration, the various components of interferometric system 20 reside above optical head 320 and so are not shown in FIG. 5.

Method of Operation

In an example method of operation of apparatus 10, the aspheric element 14 to be tested is placed on base 230. This placement may be at a select orientation relative to the reference orientation REF, as discussed above. As apparatus 10 is capable of making either a wavefront-based measurement or a profile-based measurement, an operator decides which type of measurement to make first.

Assuming the wavefront-based measurement is selected first, optical measurement probe 310 is rotated so that it is not in the way of the wavefront-based measurement (see, e.g., FIG. 1). The interferometric system 20 is then activated by causing light source and detection optical system 22 to emit light 30. This can be done manually or via the operation of controller 350.

The light 30 is used to optically interrogate aspheric surface 12 and collect wavefront-based measurement data of the aspheric surface. More specifically, light 30 is directed generally in the—Z-direction to aspheric surface 12 through optical system 28 and null optical element 24. A portion of light 30 is reflected by reference surface 28 and defines a reference wavefront 30R for use by light source and detection optical system 22. The aspheric surface 12 reflects at least a portion of light 30 to form a sample wavefront 30S. The sample wavefront 30S travels generally in the +Z-direction and through null optical element 24 and optical system 28 and to light source and detection optical system 22. The light source and detection optical system 22 thus receives and detects the sample and references wavefronts 30S and 30R. The wavefront-based measured is thus a non-contact type of surface measurement.

These two wavefronts 30S and 30R interfere and are detected within the light source and detection optical system 22 and generate an interference pattern, which is embodied in an interference pattern electrical signal S1. This electrical signal S1 is sent to controller 350, wherein processor 352 processes the signal to extract wavefront-based measurement data about aspheric surface 12. The wavefront-based data includes two main data components: a non-rotationally symmetric data component and mid-spatial-frequency data component.

In an example, the mid-spatial frequencies are in the range from 0.1 mm to 10 mm. In another example, the mid-spatial frequencies are defined as a percentage of the diameter of aspheric surface 12, e.g., from 1% to 10% of the diameter.

FIGS. 6A and 6B are gray-scale plots (derived from color plots) that respectively illustrate a non-rotationally symmetric data component 410NRS and a mid-spatial-frequency data component 410MSF of the wavefront-based data. These data components are presented in FIGS. 6A and 6B as the deviation from the target or ideal shape of aspheric surface 12. This is accomplished by virtue of processor 352 utilizing the ideal aspheric-surface-shape data stored in memory 354. The controller 350 can also display the wavefront-based data on display 356. The wavefront-based data can also be stored in memory 354, along with the non-rotationally symmetric data component, the mid-spatial-frequency data components and the aforementioned ideal aspheric-surface-shape data.

In an example, base 230 can be rotated and one more additional wavefront-based measurement is made at different rotation orientations θ to more accurately characterize the non-rotationally symmetric data component of aspheric surface 12. Thus, in an example, a series of well-selected rotational positions (orientations) θ are selected that allow the angular-dependent variations of aspheric surface 12 to be separated from any measurement-induced errors from interferometric system 20. These errors can include mid-spatial-frequency errors up to the detection limit of interferometric system 20.

Once the wavefront-based measurement is completed, apparatus 10 is then used to perform the profile-based measurement. This means that the second measurement can be performed without removing aspheric element 14 from base 230. The profile-based measurement is performed by causing rotational support member 300 to rotate, which causes optical measurement probe 310 to rotate. This rotation causes optical head 320 to swing over a scan path SP that has a substantially constant radius and is in close proximity to aspheric surface 12, thereby defining a gap G (see FIGS. 2 and 5).

The light 322 from optical head 320 reflects from aspheric surface 12 as reflected light 322R as optical head 320 is scanned over the aspheric surface. The reflected light 322R is collected by optical head 320 and is used to calculate the size of gap G as a function of position along the scan path. The base 230 can be rotated between each scan so that different linear sections of aspheric surface 12 are covered, with each scan passing through the center of the aspheric surface. In an example, the scanning process is performed one or more times, e.g., between 1 and 10 times. The profile-based measured is a non-contact type of surface measurement.

In an example, the time to complete a given scan is about 20 seconds. In an example, the profile-based data from multiple scans is averaged to provide averaged surface profile data that smooths out measurement variations as a function of orientation angle θ as well as inherent profile-instrument noise.

Figure 6C:
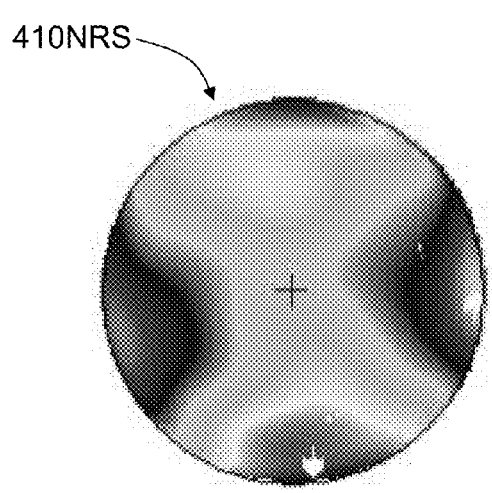
FIG. 6C schematically illustrates the measured surface profile for a given scan of the optical head as compared to a reference curve defined by a scan path of the optical head.
Figure 6C:
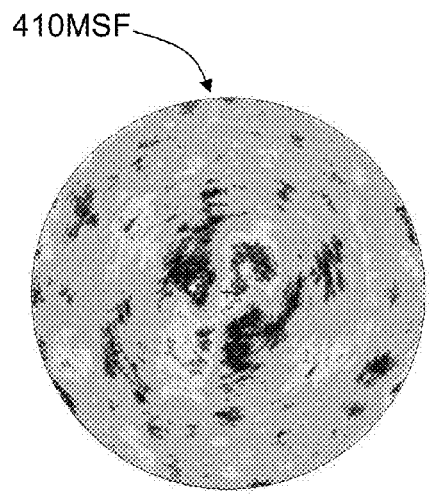
Figure 6C:
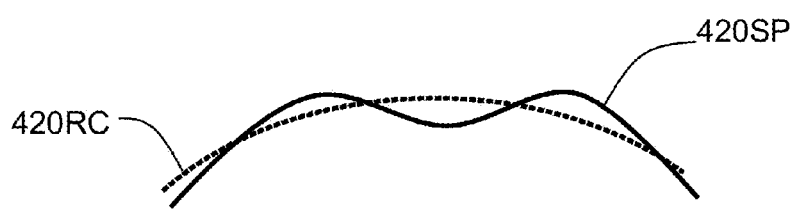

The rotational support member 300 can be translated along the Z-direction to optimize the placement of optical head 320. Likewise, stage 220 can be translated along the Z-direction to ensure that aspheric surface 12 is properly arranged relative to rotation axis A2 of optical measurement probe 310. The near-perfectly circular scan path SP that is traversed by optical head 320 of measurement probe 310 becomes a reference curve that is used to measure the profile of aspheric surface 12 to nanometer-level accuracy. FIG. 6C schematically illustrates a measured surface profile 420SP for a given scan of optical head 320 as compared to a reference curve 420R defined by scan path SP.

The profile measurement for a given scan of optical head 320 over aspheric surface 12 is embodied in a profile electrical signal S1 that is sent to controller 350. The processor 352 receives and processes the one or more profile electrical signals S2 to extract surface profile data, which can be stored in memory 354. In an example, the surface profile data includes a rotationally symmetric component. The processor 352 extracts this rotationally symmetric component and stores it in memory 354. In an example, processor 352 converts the one-dimensional (1D) scan into a two-dimensional (2D) map that has rotational symmetry. This 2D map is then stored in memory 354.

Figure 7:
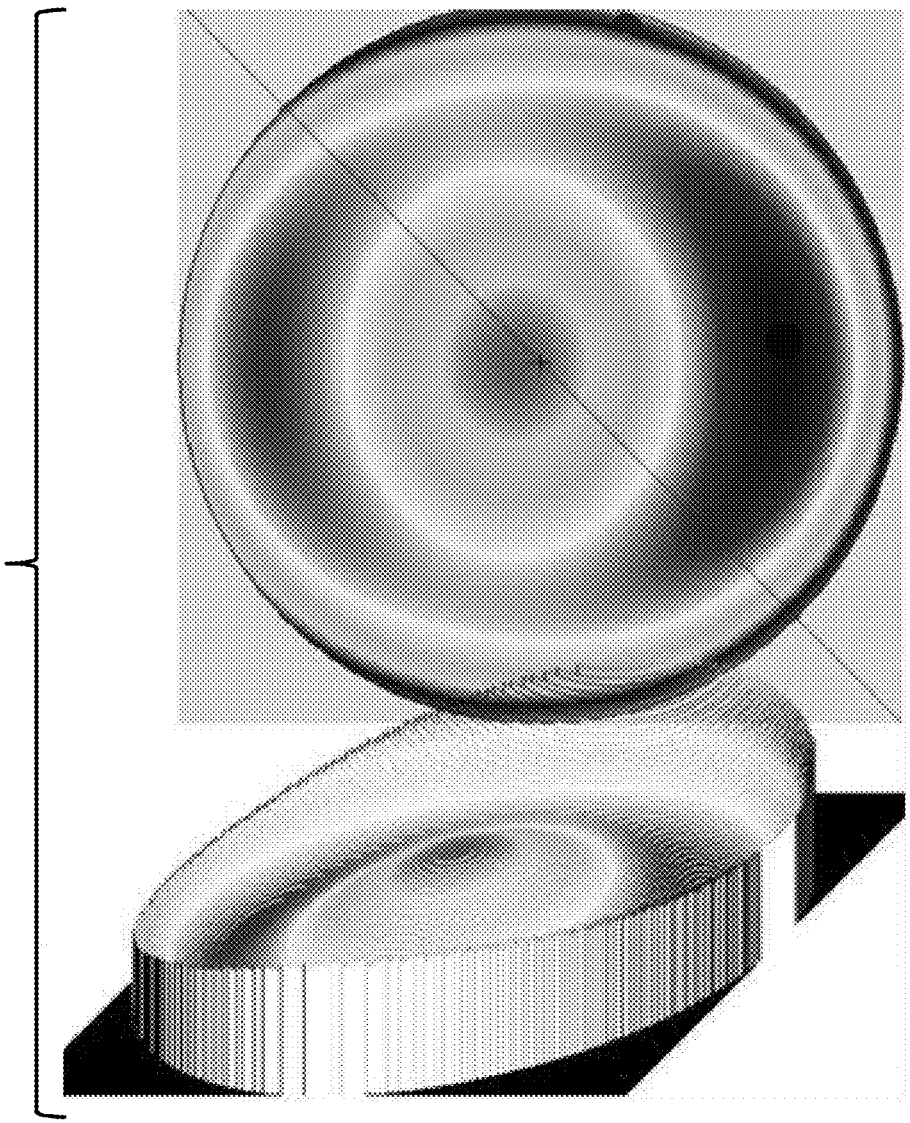
FIG. 7 is an example gray-scale representation of a two-dimensional color plot that shows a combined characterization of the aspheric surface as a deviation of the measured surface from its ideal aspheric surface shape.

Once the wavefront-based data and profile-based data are collected, they are processed to form a combined characterization of aspheric surface 12. In an example embodiment, this includes processor 352 combining the non-rotationally symmetric data component and the mid-spatial-frequency component of the wavefront-based data and the rotationally symmetric data component of the profile-based data and comparing the combined data to the ideal aspheric-surface-shape data stored in memory 354. In an example, the combined data components, when compared to the ideal aspheric-surface-shape data, provide a characterization of the difference in shape between the target or ideal aspheric surface 12 and the actual aspheric surface as manufactured. FIG. 7 is an example gray-scale representation of a two-dimensional color plot that shows a combined characterization of aspheric surface 12 as a deviation of the measured surface from its ideal aspheric surface shape.

The combined characterization of aspheric surface 12 has the benefit of the more accurate profile-based measurement of the rotationally symmetric surface component and of the more accurate wavefront-based measurement of the non-rotationally symmetric component along with the better resolution of the mid-spatial-frequency measurement component of the wavefront-based measurement.

In an example, apparatus 10 can characterize aspheric surface 12 in about one-third of the time it takes make the characterization using separate measurement apparatus for the wavefront-based measurement and the profile-based measurement. Not having to remove and then re-mount aspheric element 14 to a different base in a different tool also serves to improve the accuracy of both measurements. In addition, apparatus 10 represents a substantial cost savings by avoiding duplicate components, such as duplicate computers, alignment stages, support structures, etc.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An apparatus for measuring a shape of an aspheric surface of an aspheric element, comprising:
   a support structure;
   a moveable stage moveably attached to the support structure;
   a rotatable base disposed on the movable stage and adapted to rotatably support the aspheric element along an apparatus axis;
   an interferometric wavefront measurement system operably supported by the support structure and adapted to optically interrogate the aspheric surface with a measurement wavefront to collect wavefront-based measurement data of the aspheric surface;
   a profile measurement system operably supported by the support structure and adapted to perform at least one non-contact profile-based measurement of the aspheric surface to collect profile-based measurement data of the aspheric surface; and
   a controller adapted to receive and process the wavefront-based measurement data and the profile-based measurement data to define a combined measurement of the aspheric surface.

2. The apparatus of claim 1, wherein the support structure comprises a platform that supports first and second support pillars, and wherein the interferometric wavefront measurement system is supported by the first support pillar and the profile measurement system is supported by the second support pillar.

3. The apparatus of claim 2, wherein the interferometric wavefront measurement system includes a null optical element that is moveably mounted to the first support pillar.

4. The apparatus of claim 1, wherein:
   the controller includes a processor and a memory, with the memory including ideal aspheric-surface-shape data;
   the wavefront-based measurement data includes a non-rotationally symmetric data component and a mid-spatial-frequency component, wherein the profile-based measurement data includes a rotationally symmetric data component; and
   the controller is operably configured with instructions embodied in a computer-readable medium to cause the processor to process the non-rotationally symmetric data component, the mid-spatial-frequency component, the rotationally symmetric data component and the ideal aspheric-surface-shape data to define the combined measurement of the aspheric surface.

5. The apparatus of claim 1, wherein the apparatus includes the aspheric element, and wherein the aspheric element has either a generally concave or generally convex surface.

6. The apparatus of claim 1, wherein the aspheric element comprises a mirror.

7. The apparatus of claim 1, wherein the aspheric element has an actual manufactured aspheric shape and a target aspheric surface shape, and wherein combined measurement of the aspheric surface includes a difference between the actual manufactured aspheric shape and the target aspheric surface shape.

8. An apparatus for measuring a shape of an aspheric surface of an aspheric element that has an actual manufactured aspheric shape and a target aspheric surface shape, comprising:
    a moveable stage that supports a rotatable base, the rotatable base being adapted to rotatably support the aspheric element along an apparatus axis;
    an interferometric wavefront measurement system operably arranged relative to the aspheric element and that optically interrogates the aspheric surface with a measurement wavefront to collect wavefront-based measurement data of the aspheric surface;
    a profile measurement system operably arranged relative to the aspheric element and that optically interrogates the aspheric surface with probe light to perform at least one non-contact, profile-based measurement of the aspheric surface to collect profile-based measurement data of the aspheric surface; and
    a controller adapted to receive and process the wavefront-based measurement data and the profile-based measurement data to define a combined measurement of the aspheric surface.

9. The apparatus of claim 8, wherein:
    the controller includes a processor and a memory, with the memory including data representative of the target aspheric-surface-shape data;
    the wavefront-based measurement data includes a non-rotationally symmetric data component and a mid-spatial-frequency component, wherein the profile-based measurement data includes a rotationally symmetric data component; and
    the controller is operably configured with instructions embodied in a computer-readable medium to cause the processor to process the non-rotationally symmetric data component, the mid-spatial-frequency component, the rotationally symmetric data component and the target aspheric-surface-shape data to define the combined measurement of the aspheric surface.

10. The apparatus of claim 8, wherein combined measurement of the aspheric surface includes a difference between the actual manufactured aspheric shape and the target aspheric surface shape.

11. The apparatus of claim 8, wherein the apparatus includes the aspheric element, and wherein the aspheric element has either a generally concave or generally convex surface.

12. The apparatus of claim 8, wherein the interferometric wavefront measurement system and the profile measurement system are respectively supported by first and second pillars each supported by a platform, and wherein the moveable stage is moveably supported by the first pillar.

13. A method of characterizing an aspheric surface of an aspheric element that has an actual manufactured aspheric shape and a target aspheric surface shape, comprising:
    supporting the aspheric element on a rotatable base;
    performing at least one wavefront-based measurement of the aspheric surface to obtain wavefront-based measurement data that includes a non-rotationally symmetric data component and a mid-spatial-frequency data component;
    performing at least one profile-based measurement of the aspheric surface to obtain profile-based measurement data that includes a rotationally symmetric data component;
    defining, from the non-rotationally symmetric data component, the mid-spatial-frequency data component, the rotationally symmetric data component and the target aspheric surface shape, a deviation of the actual manufactured aspheric shape from the target aspheric surface shape; and
    wherein said performing of the at least one wavefront-based measurement and the at least one profile-based measurement are performed without removing the aspheric element from the rotatable base.

14. The method of claim 13, further comprising:
    performing multiple wavefront-based measurements of the aspheric surface at different angular positions of the rotatable base; and
    processing the multiple wavefront-based measurements to reduce a measurement error in the non-rotationally symmetric data component.

15. The method of claim 13, wherein performing at least one profile-based measurement includes performing between 1 and 10 profile-based measurements.

16. The method of claim 13, wherein the at least one profile-based measurement is performed before the at least one wavefront-based measurement.

17. The method of claim 13, wherein the at least one wavefront-based measurement is performed by a wavefront interferometer system, the at least one profile-based measurement is performed by a profile measurement system, and the wavefront interferometer system and the profile measurement system are each operably supported by a support frame that also supports the rotatable base on a moveable stage.

18. The method of claim 13, wherein the aspheric element has either a generally concave or generally convex aspheric surface.

19. The method of claim 13, further comprising averaging multiple profile-based measurements to establish the profile-based measurement data.

20. The method of claim 13, further comprising using a controller operably configured with instructions embodied in a computer-readable medium to cause a processor of the controller to process the non-rotationally symmetric data component, the mid-spatial-frequency component, the rotationally symmetric data component and the target aspheric-surface-shape data to determine the deviation of the actual manufactured aspheric shape from the target aspheric surface shape.

* * * * *